(12) United States Patent
Yonemura et al.

(10) Patent No.: US 8,587,845 B2
(45) Date of Patent: Nov. 19, 2013

(54) IMAGE READING APPARATUS (75) Inventors: Shigeru Yonemura, Ishikawa (JP);
Keisuke Kimura, Ishikawa (JP)

(73) Assignee: PFU Limited, Ishikawa (JP)

( * ) Notice: Subject to any disclaimer, the term of this patent is extended or adjusted under 35 U.S.C. 154(b) by 420 days.

(21) Appl. No.: 12/887,291

(22) Filed: Sep. 21, 2010

(65) Prior Publication Data
US 2011/0273753 A1 Nov. 10, 2011

(30) Foreign Application Priority Data
May 7, 2010 (JP) .................................. 2010-107609

(51) Int. Cl.
*H04N 1/04* (2006.01)
(52) U.S. Cl.
USPC ............ 358/498; 358/496; 358/473; 358/474
(58) Field of Classification Search
USPC ......... 358/496, 498, 473, 474, 296, 400, 401, 358/500, 501, 505; 399/380, 379, 367
See application file for complete search history.

(56) References Cited

U.S. PATENT DOCUMENTS

| | | | | |
|---|---|---|---|---|
| 5,156,390 A * | 10/1992 | Nagao et al. | ................... | 271/202 |
| 5,464,205 A * | 11/1995 | Bang | ............................. | 271/213 |
| 5,915,691 A * | 6/1999 | Deguchi et al. | ........... | 271/265.01 |
| 6,384,940 B1 * | 5/2002 | Kawai et al. | ................... | 358/474 |
| 6,942,211 B2 * | 9/2005 | Teo et al. | ....................... | 271/145 |
| 7,290,952 B2 * | 11/2007 | Kagami | ......................... | 400/693 |
| 7,380,787 B2 | 6/2008 | Fukumura | | |
| 7,536,148 B2 | 5/2009 | Fukumura | | |
| 7,621,525 B2 * | 11/2009 | Kanome et al. | ................ | 271/162 |
| 8,169,669 B2 * | 5/2012 | Yoshida et al. | ................ | 358/471 |
| 8,210,517 B2 | 7/2012 | Osakabe et al. | | |
| 2007/0127962 A1 | 6/2007 | Fukumura | | |
| 2012/0061906 A1 | 3/2012 | Osakabe | | |
| 2012/0175837 A1 | 7/2012 | Osakabe | | |

FOREIGN PATENT DOCUMENTS

| | | | |
|---|---|---|---|
| CN | 1671172 | A | 9/2005 |
| CN | 101472033 | A | 7/2009 |
| JP | 05-147800 | A | 6/1993 |

OTHER PUBLICATIONS

Chinese Search Report dated May 13, 2013 for CN 201010530472.

* cited by examiner

*Primary Examiner* — Cheukfan Lee
(74) *Attorney, Agent, or Firm* — Lowe Hauptman & Ham, LLP (57) ABSTRACT

An image reading apparatus includes a lower unit, an upper unit arranged above the lower unit and a guide arranged on an opposite side to the lower unit with respect to the upper unit. The guide relatively rotates with respect to the upper unit in a direction away from the upper unit so as to form an ejection path, between the upper unit and the guide, of a sheet-like medium conveyed between the upper unit and the lower unit. The upper unit and the guide are close to each other respectively, at positions closest to the lower unit in respective rotation ranges of relative rotation with respect to the lower unit. The rotation range of the guide is wider than that of the upper unit, in a rotation direction away from the lower unit from the positions close to each other.

12 Claims, 10 Drawing Sheets

IMAGE READING APPARATUS

CROSS-REFERENCE TO RELATED APPLICATIONS

This application is based upon and claims the benefit of priority from Japanese Patent Application No. 2010-107609, filed May 7, 2010, the entire contents of which are incorporated herein by reference.

BACKGROUND OF THE INVENTION

1. Field of the Invention

The present invention relates to an image reading apparatus.

2. Description of the Related Art

Conventionally, there has been known an image reading apparatus that includes a lower unit, an upper unit rotatably supported by the lower unit, and a guide, and is capable of ejecting a medium between the upper unit and the lower unit.

Japanese Patent Application Laid-open No. H5-147800 discloses a technique for a paper-ejection guide device in a paper-conveying type scanner that can switch its ejecting direction of an original between forward ejection and backward ejection by switching a position of a movable guide plate.

There is still a room for improvement in facilitating jam clearance when paper jam (a medium being stuck in the apparatus) occurs in the image reading apparatus. For example, in an image reading apparatus that can eject a medium between an upper unit and a guide, when the upper unit is relatively rotated with respect to the lower unit for clearing the paper jam, it is desired to prevent the medium from being lodged between the upper unit and the guide. Further, it is desired to prevent the image reading apparatus from becoming large.

SUMMARY OF THE INVENTION

It is an object of the present invention to at least partially solve the problems in the conventional technology.

According to an aspect of the present invention, an image reading apparatus includes a lower unit; an upper unit that is arranged above the lower unit and is rotatably supported by the lower unit; and a guide that is arranged on an opposite side to the lower unit with respect to the upper unit and is rotatably supported coaxially with a center of rotation of the upper unit, wherein the guide relatively rotates with respect to the upper unit in a direction away from the upper unit so as to form an ejection path, between the upper unit and the guide, of a sheet-like medium conveyed between the upper unit and the lower unit, the upper unit and the guide are close to each other respectively, at positions closest to the lower unit in respective rotation ranges of relative rotation with respect to the lower unit, and the rotation range of the guide is wider than that of the upper unit, in a rotation direction away from the lower unit from the positions close to each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplarily embodiments of an image reading apparatus according to the present invention will be explained below in detail with reference to the accompanying drawings. The present invention is not limited to the embodiments. In addition, constituent elements in the embodiments include those that can be easily assumed by persons skilled in the art or that are substantially equivalent.

Figure 1:
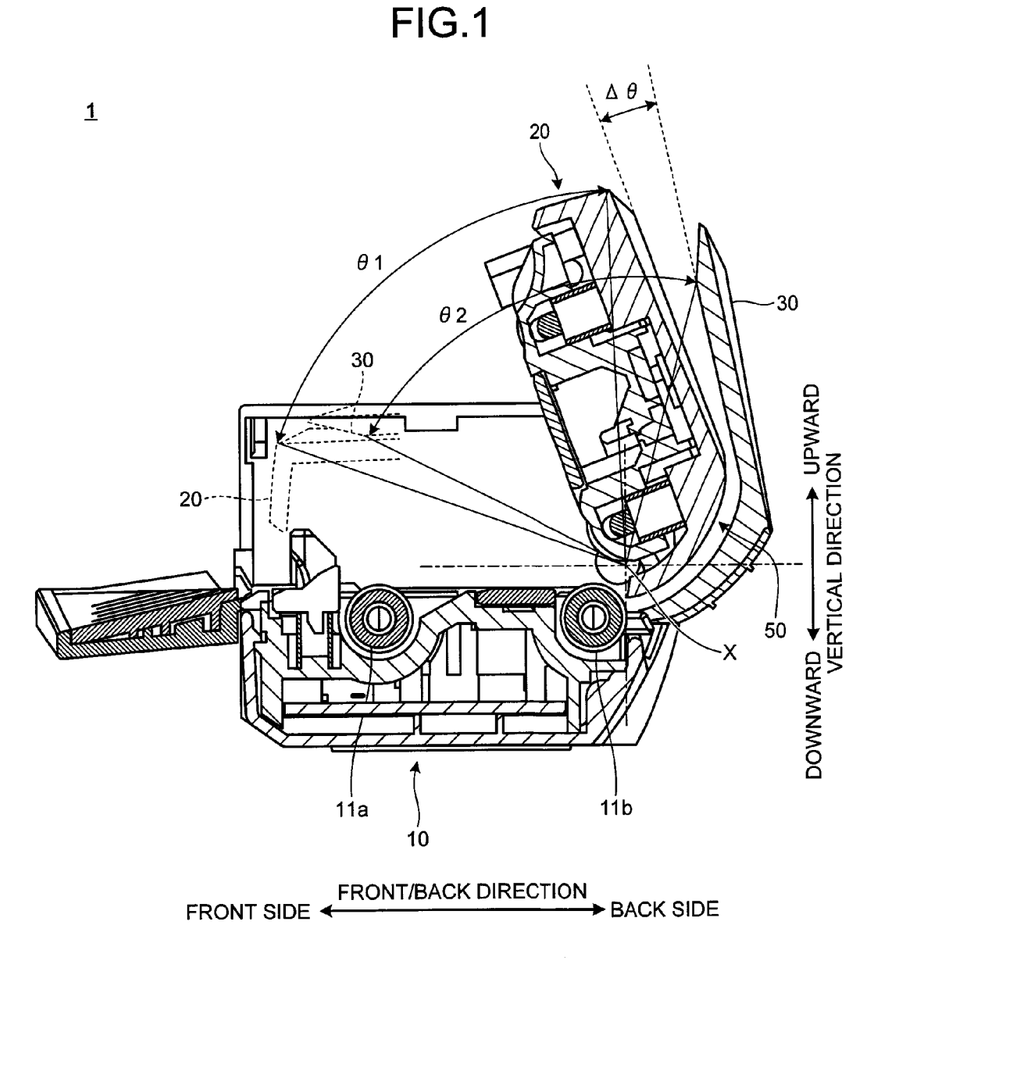
FIG. 1 is a sectional view representing a state at the time of clearing paper jam in an image reading apparatus according to an embodiment of the present invention.

An embodiment of the present invention is explained with reference to FIGS. 1 to 9. This embodiment relates to an image reading apparatus. FIG. 1 is a sectional view representing a state at the time of clearing paper jam in the image reading apparatus according to the embodiment, FIG. 2 is a sectional view representing the image reading apparatus according to the embodiment, and FIG. 3 is a perspective view representing the image reading apparatus according to the embodiment.

An image reading apparatus 1 according to the present embodiment includes a paper ejection guide 30 capable of switching a path. The path is switched between straight face-up ejection shown in FIG. 5 and U-turn face-down ejection shown in FIG. 7 by the paper ejection guide 30. Accordingly, a conveying load of a sheet-like medium such as a sheet can be reduced according to an application of thick paper and thin paper, and a paper ejection area can be reduced.

In the image reading apparatus 1 according to the present embodiment, as shown in FIG. 1, an ejection-guide rotation range $\theta 2$, which is a rotation range of the paper ejection guide 30, is wider than an upper-unit rotation range $\theta 1$, which is a rotation range of an upper unit 20. The upper unit 20 and the paper ejection guide 30 come close to each other at respective positions closest to a lower unit 10 in the respective rotation ranges. The upper-unit rotation range $\theta 1$ and the ejection-guide rotation range $\theta 2$ are ranges rotatable from the positions close to each other in a rotation direction away from the lower unit 10. Because the ejection-guide rotation range $\theta 2$ is wider than the upper-unit rotation range $\theta 1$, a clearance between the paper ejection guide 30 and the upper unit 20 is ensured at the time of clearing paper jam, and it can be prevented that a medium S is lodged between the paper ejection guide 30 and the upper unit 20. Because the paper ejection guide 30 and the upper unit 20 are coaxially and rotatably supported, downsizing of the image reading apparatus 1 can be realized.

Figure 2:
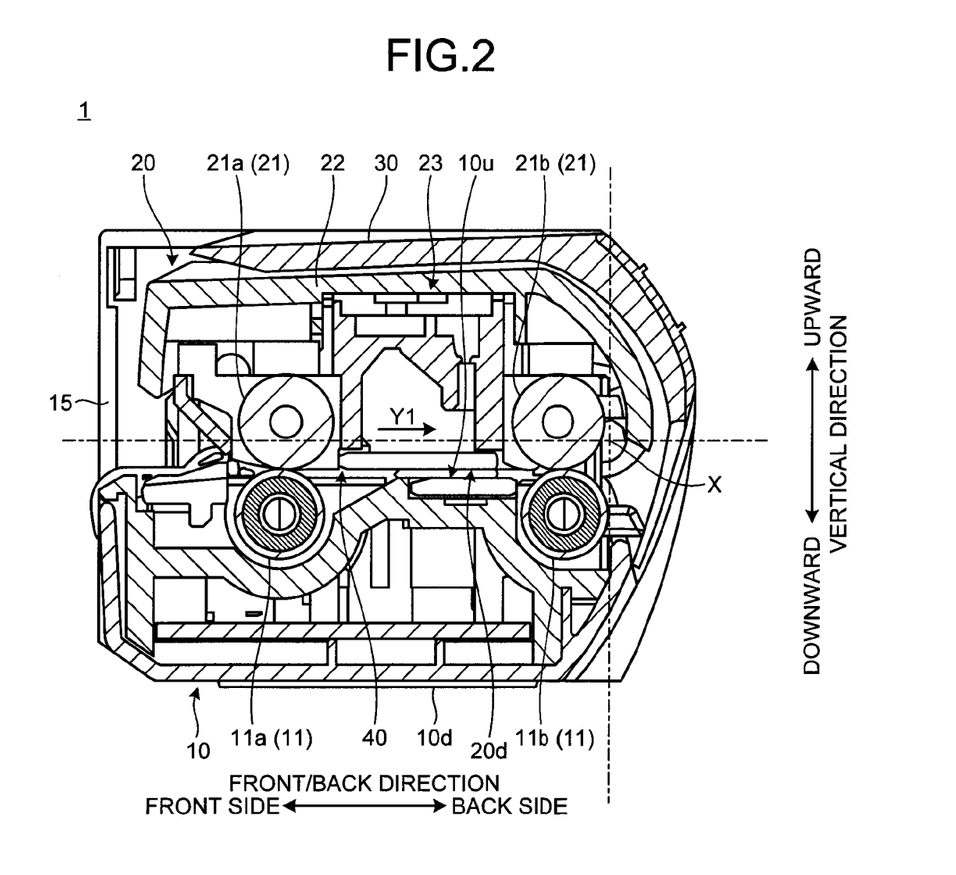
FIG. 2 is a sectional view representing the image reading apparatus according to the embodiment.
Figure 3:
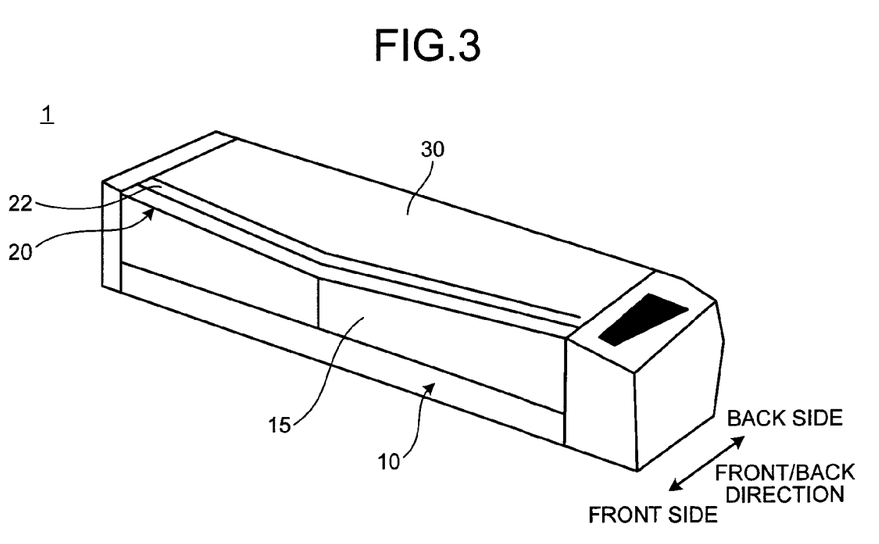
FIG. 3 is a perspective view representing the image reading apparatus according to the embodiment.

The image reading apparatus 1 shown in FIG. 2 conveys a sheet-like medium manually fed by an operator and moves the medium to a fixed line image sensor, thereby reading image information of the medium. The image reading apparatus 1 includes the lower unit 10, the upper unit 20, and the paper ejection guide 30. The image reading apparatus 1 is mounted in a state with the lower unit 10 being positioned on a vertically lower side, and the upper unit 20 being positioned on a vertically upper side. The image reading apparatus 1 is mounted with a lower surface 10d of the lower unit 10 facing downward. In the following explanations, a vertical direction is a vertical direction of the image reading apparatus 1 in a mounted state. A front side in a front/back direction of the image reading apparatus is described as "front side", and a rear side thereof is described as "back side".

The lower unit 10 is positioned on a lower part in the image reading apparatus 1, in a state mounted on a desk or the like. The lower unit 10 includes a conveying roller 11 (11a and 11b) and a chute 15. An arrow Y1 indicates a conveyance direction in which the medium S is conveyed. The upstream-side conveying roller 11a is arranged on the upstream side of the downstream-side conveying roller 11b in the conveyance direction. The conveying roller 11 is rotated by a drive unit such as a motor. The conveying roller 11 can apply a conveying force in the conveyance direction with respect to the reading target sheet-like medium.

Figure 5:
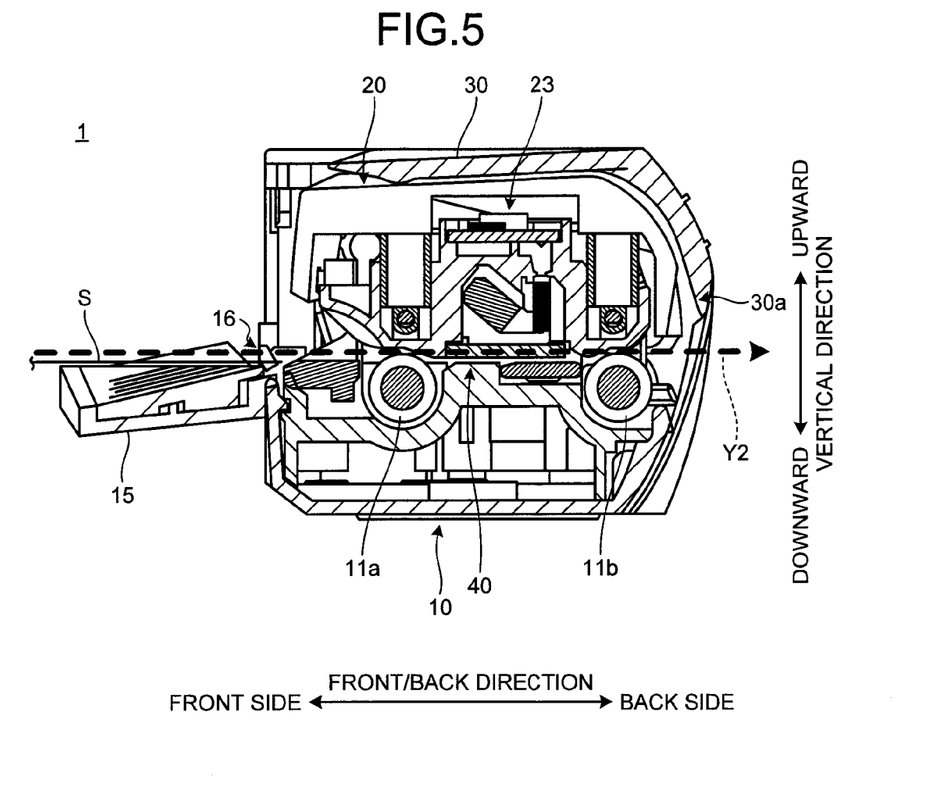
FIG. 5 is a sectional view representing an image reading apparatus at the time of face-up paper ejection.

The chute 15 is an openable and closable paper setting table. FIG. 2 depicts a state that the chute 15 is closed. The chute 15 is rotatably supported at one end, so that it can be switched between a state that the chute 15 abuts against the upper unit 20 and closed as shown in FIG. 2 and a state that the chute 15 is opened forward as shown in FIG. 5.

The upper unit 20 is positioned above the lower unit 10. An upper surface 10u of the lower unit 10 and a lower surface 20d of the upper unit 20 vertically face each other with a predetermined gap therebetween. A conveyance path 40 is formed between the upper unit 20 and the lower unit 10. The conveyance path 40 is formed of the lower surface 20d of the upper unit 20 and the upper surface 10u of the lower unit 10, to guide the medium S to be conveyed.

The upper unit 20 includes a driven roller 21 (21a and 21b) corresponding to the conveying roller 11, an imaging unit 23, and an upper cover 22. The upstream-side driven roller 21a corresponds to the upstream-side conveying roller 11a, and the upstream-side driven roller 21a and the upstream-side conveying roller 11a vertically face each other, putting the conveyance path 40 therebetween. The downstream-side driven roller 21b corresponds to the downstream-side conveying roller 11b, and the downstream-side driven roller 21b and the downstream-side conveying roller 11b vertically face each other, putting the conveyance path 40 therebetween.

The imaging unit 23 picks up an image of the medium S to be conveyed, to generate image data. The imaging unit 23 is arranged between the upstream-side driven roller 21a and the downstream-side driven roller 21b in the conveyance direction, to picks up an image of the upper surface of the medium S. The upper cover 22 forms the upper surface of the upper unit 20, and covers respective units in the upper unit 20 from above.

The upper unit 20 is rotatably supported by the lower unit 10 on a proximal end side, which is a rear end side in the front/back direction. In FIG. 2, reference letter X denotes a central axis of rotation of the upper unit 20. The central axis X is positioned at the back of the downstream-side driven roller 21b, that is, on the back side in the image reading apparatus 1. The upper unit 20 is supported by the lower unit 10 via a bearing or the like with respect to the lower unit 10, using the central axis X as a center of rotation. The upper unit 20 can relatively rotate with respect to the lower unit 10 in a predetermined rotation range, using the central axis X as the center of rotation. In the following explanations, a rotation range of relative rotation of the upper unit 20 with respect to the lower unit 10 from the position closest to the lower unit 10 is described as "upper-unit rotation range". In FIG. 2, a state that the upper unit 20 is positioned closest to the lower unit 10 in the upper-unit rotation range, and the image reading apparatus 1 can pick up an image of the medium S is shown. In the following explanations, the "position closest to the lower unit 10 in the upper-unit rotation range" is described as "position at the time of picking up an image".

When the upper unit 20 is at the position of picking up an image, the lower surface 20d of the upper unit 20 and the upper surface 10u of the lower unit 10 face each other while being substantially parallel to each other with a predetermined gap therebetween, thereby forming the conveyance path 40. When the upper unit 20 is at the position of picking up an image, the upstream-side driven roller 21a is pressed against the upstream-side conveying roller 11a, and the downstream-side driven roller 21b is pressed against the downstream-side conveying roller 11b. Accordingly, the conveying roller 11 can apply the conveying force in the conveyance direction with respect to the medium S put between the conveying roller 11 and the driven roller 21, to convey the medium S in the conveyance direction.

The paper ejection guide 30 forms a paper ejection path of the medium S between the upper unit 20 and itself. The paper ejection guide 30 is arranged with respect to the upper unit 20 on the opposite side to the lower unit 10. That is, the paper ejection guide 30 is arranged above the upper unit 20 in a state with the image reading apparatus 1 being mounted. The paper ejection guide 30 is rotatably supported by the lower unit 10 on the proximal end side, which is the rear end side in the front/back direction. The paper ejection guide 30 is supported rotatably and coaxially with the central axis X of the upper unit 20. The paper ejection guide 30 is supported by the lower unit 10, for example, via a bearing. The paper ejection guide 30 and the upper unit 20 can relatively rotate with respect to the lower unit 10 respectively independently. That is, the upper unit 20 and the paper ejection guide 30 can rotate relatively.

The paper ejection guide 30 can relatively rotate with respect to the lower unit 10, using the central axis X as the center of rotation in a predetermined rotation range. In the following explanations, a rotation range of relative rotation of the paper ejection guide 30 with respect to the lower unit 10 from the position closest to the lower unit 10 is described as "ejection-guide rotation range". In FIG. 2, a state that the paper ejection guide 30 is positioned closest to the lower unit 10 in the ejection-guide rotation range, that is, a state that the paper ejection guide 30 is at the most closed position is shown. In the following explanations, the state that the paper ejection guide 30 is at the most closed position is described as a guide closed state. The paper ejection guide 30 relatively rotates with respect to the upper unit 20 in a direction away from the upper unit 20 to form the paper ejection path between the upper unit 20 and itself.

The paper ejection guide 30 and the upper cover 22 are formed in a corresponding shape. In the paper ejection guide 30 and the upper cover 22, proximal end portions thereof are respectively curved in a shape protruding in a direction away from the lower unit 10. Because the paper ejection guide 30 and the upper cover 22 have the corresponding shape, the paper ejection guide 30 and the upper cover 22 relatively rotate in a direction approaching each other, to come close to each other. As shown in FIG. 2, when the upper unit 20 is at the position at the time of picking up an image and the paper ejection guide 30 is at a position closest to the lower unit 10 in the ejection-guide rotation range, the paper ejection guide 30 is closed closely along the upper cover 22. That is, the upper unit 20 and the paper ejection guide 30 come close to each other at the positions closest to the lower unit 10 in the respective rotation ranges of relative rotation with respect to the lower unit 10. Accordingly, downsizing of the image reading apparatus 1 at the time of closing the guide can be realized.

Figure 4:
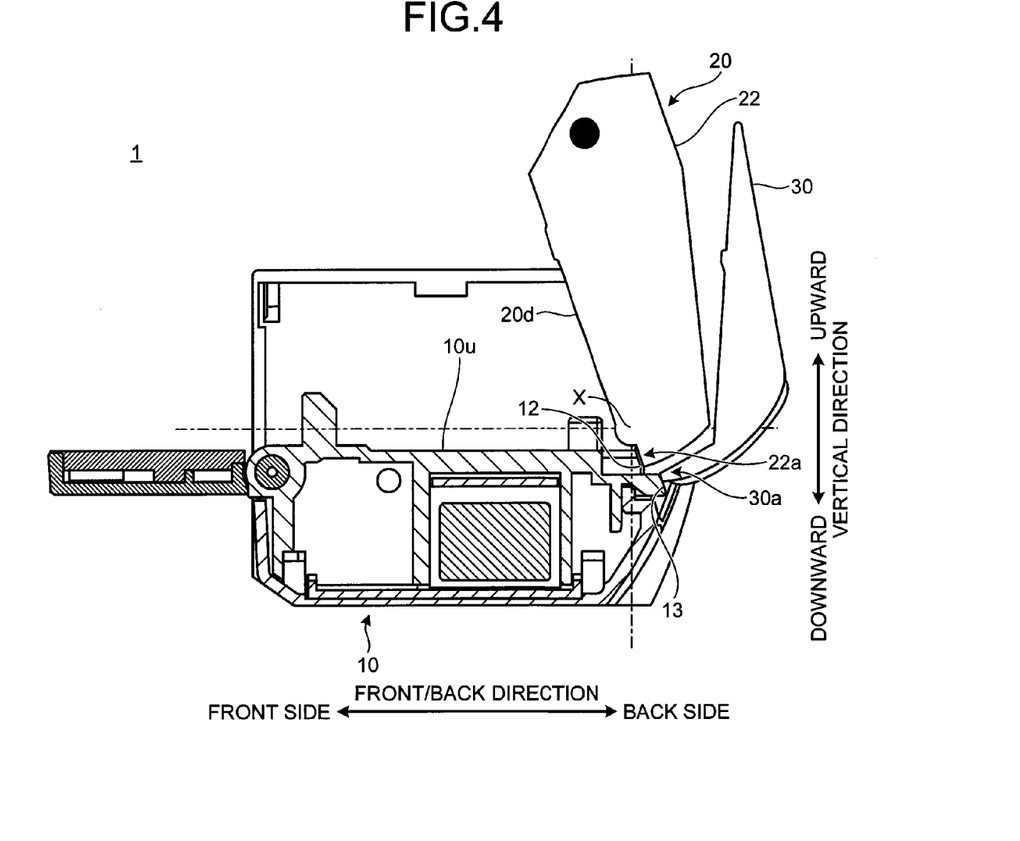
FIG. 4 is a schematic diagram for explaining a stopper provided in a lower unit.

FIG. 4 is a schematic diagram for explaining a stopper provided in the lower unit 10. As shown in FIG. 4, an upper cover stopper 12 and a paper-ejection guide stopper 13 are formed in the lower unit 10. The upper cover stopper 12 and the paper-ejection guide stopper 13 are formed in an upper part on the back side in the lower unit 10. The upper cover stopper 12 and the paper-ejection guide stopper 13 are positioned on a downstream side of the downstream-side conveying roller 11b in the conveyance direction.

The upper cover stopper 12 is a first stopper that regulates the upper unit 20 not to rotate beyond the upper-unit rotation range. When the upper unit 20 relatively rotates with respect to the lower unit 10, using the central axis X as the center of rotation, the upper cover 22 abuts against the upper cover stopper 12. When the upper unit 20 relatively rotates with respect to the lower unit 10, a proximal end portion 22a of the upper cover 22 rotates using the central axis X as the center of rotation. The upper cover stopper 12 is formed on a rotation trajectory of the proximal end portion 22a of the upper cover 22. When the proximal end portion 22a of the upper cover 22 abuts against the upper cover stopper 12, rotation of the upper unit 20 is regulated so that the upper unit 20 cannot rotate further in the direction away from the lower unit 10. That is, when the upper unit 20 rotates in the direction away from the lower unit 10, the upper cover stopper 12 regulates the upper unit 20 not to rotate beyond the upper-unit rotation range.

The paper-ejection guide stopper 13 is a second stopper that regulates the paper ejection guide 30 not to rotate beyond the ejection-guide rotation range. The paper-ejection guide stopper 13 is formed at a position where the paper ejection guide 30 abuts against the paper-ejection guide stopper 13 when the paper ejection guide 30 relatively rotates with respect to the lower unit 10, using the central axis X as the center of rotation. The paper-ejection guide stopper 13 is formed on a rotation trajectory of a proximal end portion 30a of the paper ejection guide 30. When the proximal end portion 30a of the paper ejection guide 30 abuts against the paper-ejection guide stopper 13, rotation of the paper ejection guide 30 is regulated so that the paper ejection guide 30 cannot rotate further in the direction away from the lower unit 10. That is, when the paper ejection guide 30 rotates in the direction away from the lower unit 10, the paper-ejection guide stopper 13 regulates the paper ejection guide 30 not to rotate beyond the ejection-guide rotation range.

In FIG. 4, a state that the upper cover 22 abuts against the upper cover stopper 12, and the paper ejection guide 30 abuts against the paper-ejection guide stopper 13 is shown. In the state that the paper ejection guide 30 abuts against the paper-ejection guide stopper 13, that is, the paper ejection guide 30 is at the most opened position, the paper ejection guide 30 is at a position farthest away from the lower unit 10 in the ejection-guide rotation range. In the following explanations, a state that the paper ejection guide 30 is at the most opened position is described as a guide opened state. In the guide opened state, the proximal end portion 30a of the paper ejection guide 30 is positioned below the upper surface (a surface forming the conveyance path 40) 10u of the lower unit 10.

The image reading apparatus 1 includes a lock mechanism (not shown) that locks the paper ejection guide 30, respectively, in the guide opened state and the guide closed state. When the paper ejection guide 30 is rotated from the position in the guide opened state and when the paper ejection guide 30 is rotated from the position in the guide closed state, the lock mechanism needs to be released. Due to the lock mechanism provided in this manner, a clearance can be ensured between the paper ejection guide 30 and the upper cover 22, for example, in the guide opened state to form a paper ejection path 50 described later reliably. Further, because the lock mechanism is provided, the clearance can be ensured between the upper unit 20 and the paper ejection guide 30 at the time of clearing paper jam in the guide opened state, to prevent the medium S from being lodged between the upper unit 20 and the paper ejection guide 30.

As explained below with reference to FIGS. 5 to 7, the image reading apparatus 1 picks up an image of the medium S inserted from the front side and ejects the medium S from the back side. The image reading apparatus 1 can perform path switching for selectively performing face-up paper ejection in which the imaged medium S is ejected straight from the back side and face-down paper ejection in which the medium S imaged and conveyed to the back side is U-turned and ejected.

FIG. 5 is a sectional view representing the image reading apparatus 1 at the time of face-up paper ejection. As shown in FIG. 5, when an image is read, the chute 15 is opened. The upper surface of the chute 15 functions as a guide surface for guiding the medium S to the conveyance path 40. The upper surface of the chute 15 extends from an opening 16 formed at the upstream end of the conveyance path 40 toward the upstream side in the conveyance direction. Accordingly, the operator can easily insert the medium S into the conveyance path 40 from the opening 16 by moving the medium S in the conveyance direction along the chute 15. The medium S fed from the opening 16 is conveyed in the conveyance direction by the upstream-side conveying roller 11a toward the imaging unit 23 and imaged by the imaging unit 23. The imaged medium S is further conveyed toward the downstream side in the conveyance direction by the downstream-side conveying roller 11b.

At the time of face-up paper ejection, the paper ejection guide 30 is in the guide closed state. In the guide closed state, the proximal end portion 30a of the paper ejection guide 30 is above the conveyance path 40. That is, in the guide closed state, because the paper ejection guide 30 is not on a track of the medium S conveyed on the conveyance path 40, the medium S travels straight ahead on the conveyance path 40 as shown by an arrow Y2, and is ejected from the back side of the image reading apparatus 1. That is, at the time of face-up paper ejection, the medium S is ejected straight from the back side of the image reading apparatus 1 without via the paper ejection path 50 between the paper ejection guide 30 and the upper unit 20. Because face-up paper ejection is straight ejection, the conveying load of the medium S can be reduced. Face-up paper ejection is suitable at the time of reading a thick medium S, for example.

Figure 6:
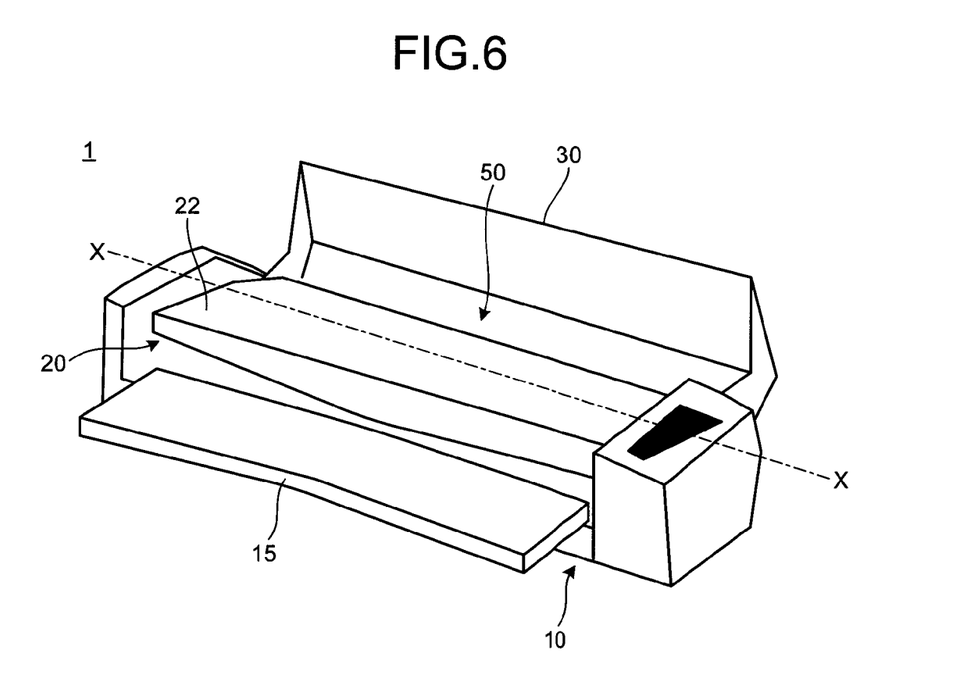
FIG. 6 is a perspective view representing the image reading apparatus at the time of face-down paper ejection.
Figure 7:
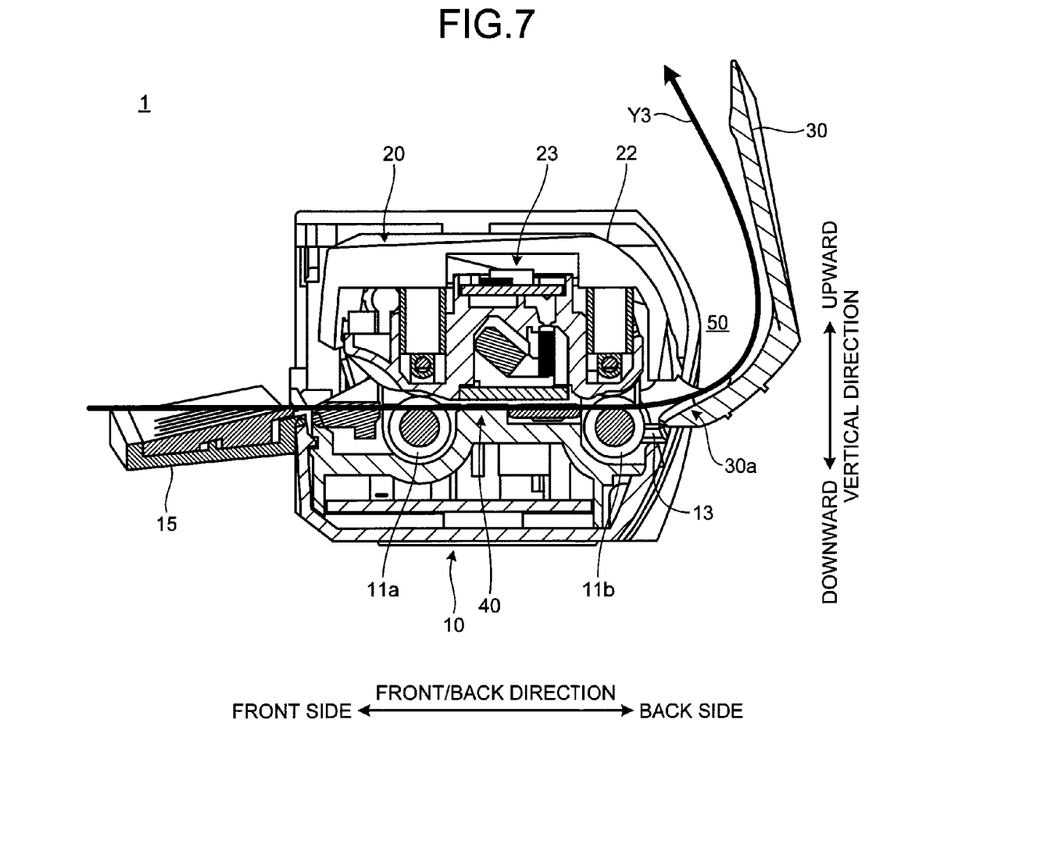
FIG. 7 is a sectional view representing the image reading apparatus at the time of face-down paper ejection.

FIG. 6 is a perspective view representing the image reading apparatus 1 at the time of face-down paper ejection, and FIG. 7 is a sectional view representing the image reading apparatus 1 at the time of face-down paper ejection. As shown in FIGS. 6 and 7, at the time of face-down paper ejection, the paper ejection guide 30 is in the guide opened state. The upper unit 20 is set at the position at the time of picking up an image, and the paper ejection guide 30 is in the guide opened state. Accordingly, the paper ejection guide 30 is away from the upper unit 20, and the paper ejection path 50 is formed between the paper ejection guide 30 and the upper cover 22 of the upper unit 20.

As explained with reference to FIG. 4, in the guide opened state, the proximal end portion 30a of the paper ejection guide 30 is positioned below the conveyance path 40. Accordingly, the medium S to be conveyed on the conveyance path 40 by the upstream-side conveying roller 11a and the downstream-side conveying roller 11b is guided to the paper ejection path 50 by the paper ejection guide 30. In the guide opened state, the proximal end portion 30a of the paper ejection guide 30 circularly inclines downward toward the upstream side in the paper ejecting direction. Accordingly, the medium S conveyed between the upper unit 20 and the lower unit 10 is smoothly guided from the conveyance path 40 to the paper ejection path 50. The medium S guided on the paper ejection path 50 moves upward along the paper ejection guide 30 and is ejected from the conveyance path 40 as shown by an arrow Y3. That is, in the case of face-down paper ejection, the medium S conveyed between the upper unit 20 and the lower unit 10 is guided to the paper ejection path 50 by the paper ejection guide 30 and is ejected via the paper ejection path 50. In the case of face-down paper ejection, a paper ejection area can be reduced by a U-turn path. A face-down paper ejection path facilitates extraction of the medium S, because the medium S returns to an inserting direction. Face-down paper ejection is suitable for reading a thin medium S, for example.

Switching between face-up paper ejection and face-down paper ejection can be performed manually, or can be performed automatically in response to an instruction from the operator. For example, path switching between face-up paper ejection and face-down paper ejection can be performed automatically by, for example, a drive unit such as a motor that rotates the paper ejection guide 30 using the central axis X as the center of rotation.

When paper jam occurs at the time of conveying the medium S, the paper jam needs to be cleared. When paper jam occurs on the conveyance path 40, the upper unit 20 is relatively rotated with respect to the lower unit 10 and opened, and the upper unit 20 is moved away from the lower unit 10, thereby enabling to remove the jammed medium S. However, at the time of face-down paper ejection, when the upper unit 20 is rotated and moved away from the lower unit 10, the medium S may be lodged between the upper unit 20 and the paper ejection guide 30. For example, when a part of the medium S is on the conveyance path 40 and the other part is guided by the paper ejection guide 30 to be on the paper ejection path 50, if the upper unit 20 is rotated to clear the paper jam, the gap between the upper unit 20 and the paper ejection guide 30 becomes narrow, and the medium S may be lodged between the upper unit 20 and the paper ejection guide 30. When the medium S is lodged between the upper unit 20 and the paper ejection guide 30, ejection of the medium S becomes difficult and the operability at the time of clearing the paper jam is deteriorated.

In the image reading apparatus 1 according to the present embodiment, the rotation range of relative rotation of the paper ejection guide 30 with respect to the lower unit 10 is wider than that of the upper unit 20 with respect to the lower unit 10. In FIG. 1, reference character θ1 denotes a range of a rotation angle when the upper unit 20 rotates using the central axis X as the center of rotation, that is, the upper-unit rotation range, which is the rotation range of relative rotation of the upper unit 20 with respect to the lower unit 10, when the upper unit 20 rotates from the position closest to the lower unit 10 in the direction away from the lower unit 10. Reference character θ2 denotes a range of the rotation angle when the paper ejection guide 30 rotates using the central axis X as the center of rotation, that is, the ejection-guide rotation range, which is the rotation range of relative rotation of the paper ejection guide 30 with respect to the lower unit 10, when the paper ejection guide 30 rotates from the position closest to the lower unit 10 in the direction away from the lower unit 10.

As shown in FIG. 1, the ejection-guide rotation range θ2 is wider than the upper-unit rotation range θ1. That is, an opened angle of the paper ejection guide 30 at the time of using the paper ejection guide is larger than that of the upper unit 20 at the time of clearing paper jam. Accordingly, in the case that paper jam occurs at the time of using the paper ejection guide, when the upper unit 20 is opened, because there is an angle difference Δθ between the opposite surfaces of the paper ejection guide 30 and the upper unit 20, a clearance can be ensured between the paper ejection guide 30 and the upper unit 20. Accordingly, it can be prevented that the medium S is lodged between the paper ejection guide 30 and the upper unit 20 at the time of clearing the paper jam.

Figure 8:
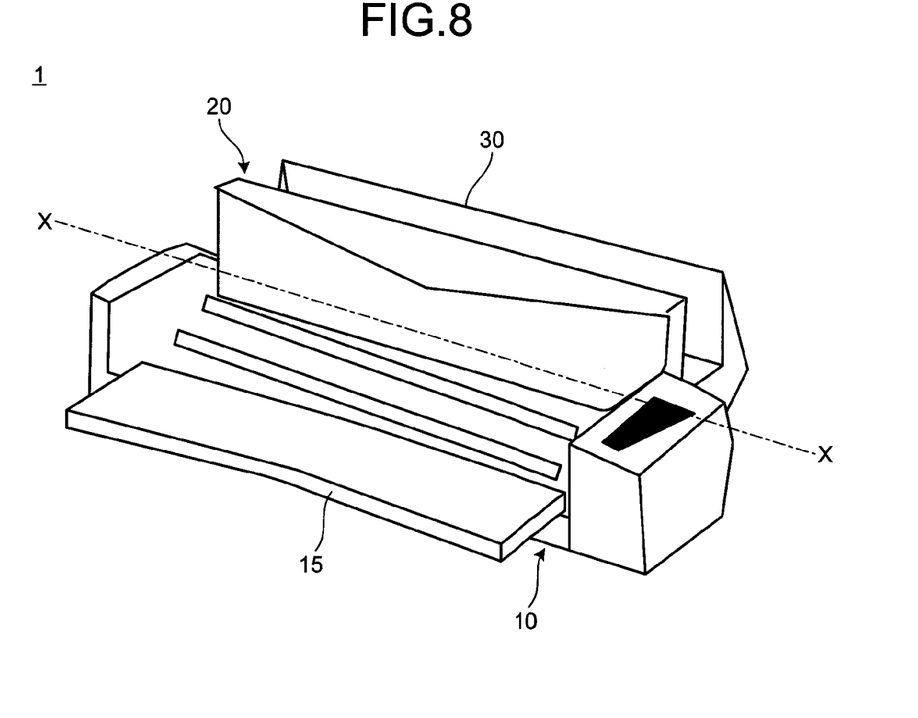
FIG. 8 is a perspective view representing the image reading apparatus at the time of clearing paper jam.
Figure 9:
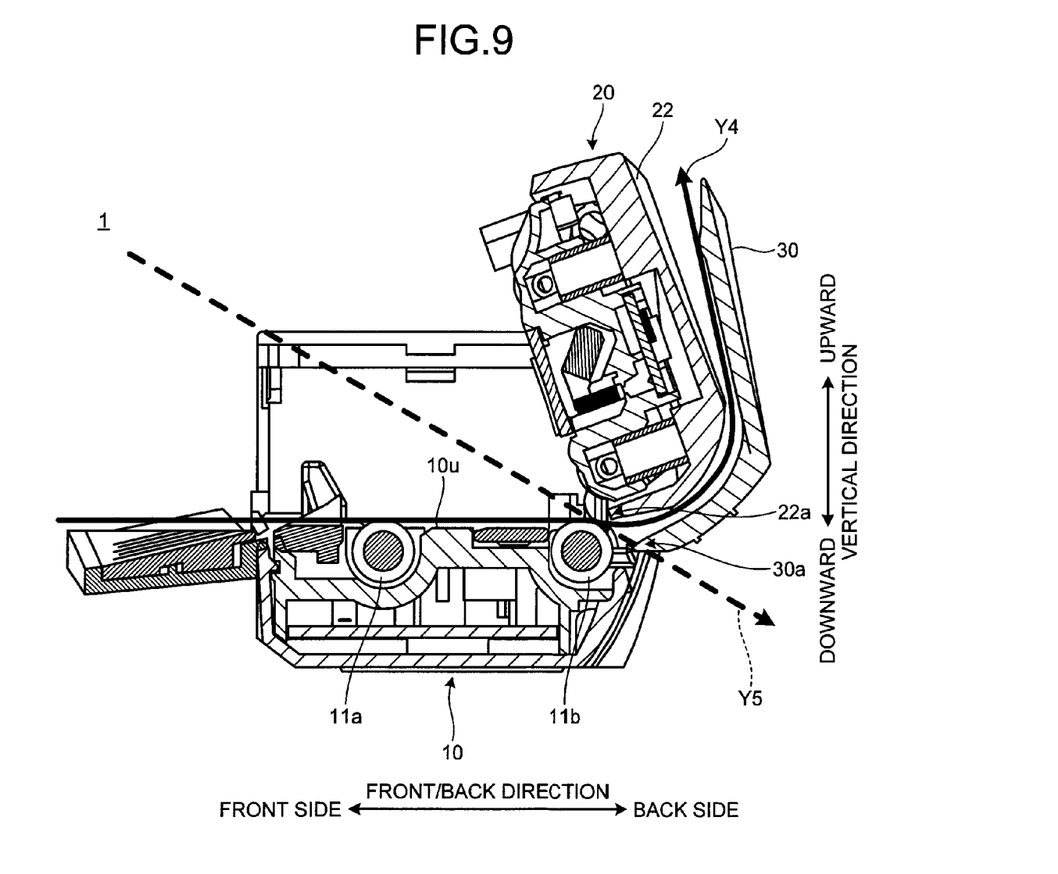
FIG. 9 is a sectional view representing the image reading apparatus at the time of clearing paper jam.

FIG. 8 is a perspective view representing the image reading apparatus 1 at the time of clearing paper jam, and FIG. 9 is a sectional view representing the image reading apparatus 1 at the time of clearing paper jam. At the time of clearing paper jam, the upper unit 20 is opened. Along with this operation, even at the time of face-up paper ejection in which the paper ejection guide 30 is closed, the paper ejection guide 30 becomes the guide opened state that the paper ejection guide 30 is opened, at the time of clearing the paper jam. As explained with reference to FIG. 1, the ejection-guide rotation range θ2 is larger than the upper-unit rotation range θ1, and the clearance is ensured between the paper ejection guide 30 and the upper unit 20. Accordingly, even if paper jam occurs at the time of face-down paper ejection, as shown by an arrow Y4, the medium S can be easily taken out from between the paper ejection guide 30 and the upper unit 20.

Even if paper jam occurs at the time of face-up paper ejection, the image reading apparatus 1 can easily take out the medium S. As shown in FIG. 9, in the state that the paper ejection guide 30 and the upper unit 20 are opened, the proximal end portion 30a of the paper ejection guide 30 and the proximal end portion 22a of the upper cover 22 are respectively away from the downstream-side conveying roller 11b. That is, as shown in FIG. 4, in the state that the paper ejection guide 30 abuts against the paper-ejection guide stopper 13 and the upper cover 22 abuts against the upper cover stopper 12, a clearance is ensured between the paper ejection guide 30 and the downstream-side conveying roller 11b, and a clearance is also ensured between the upper cover 22 and the downstream-side conveying roller 11b. Accordingly, clearance of paper jam can be performed without the medium S being lodged between the downstream-side conveying roller 11b and the paper ejection guide 30 or the upper cover 22.

In the upper surface 10u of the lower unit 10, a portion of the lower unit 10 on the back side than the downstream-side conveying roller 11b is formed in a shape that does not interfere with the paper ejection guide 30 or the upper cover 22. In the upper surface 10u of the lower unit 10 forming the conveyance path 40, the portion of the lower unit 10 on the back side than the downstream-side conveying roller 11b is positioned lower than that on the front side than the downstream-side conveying roller 11b. The portion on the back side has an inclination downward as moving toward the back side. Accordingly, when the paper ejection guide 30 and the upper unit 20 are opened, a clearance is ensured between the paper ejection guide 30 and the upper unit 20 and the upper surface 10u of the lower unit 10. Accordingly, the jammed medium S can be taken out from the back side of the image reading apparatus 1 obliquely downward as shown by an arrow Y5.

As explained above, according to the image reading apparatus 1 of the present embodiment, because the ejection-guide rotation range θ2 is wider than the upper-unit rotation range θ1, the medium S is prevented from being lodged between the upper unit 20 and the paper ejection guide 30 at the time of clearing paper jam. Further, because the upper unit 20 and the paper ejection guide 30 are supported coaxially and rotatably, downsizing of the image reading apparatus 1 can be realized. For example, the size in the front/back direction of the image reading apparatus 1 can be downsized than the case that the rotation axis of the upper unit 20 and the rotation axis of the paper ejection guide 30 are at different positions in the front/back direction.

In the present embodiment, the paper ejection guide 30 is rotatably supported by the lower unit 10; however, the present invention is not limited thereto, and the paper ejection guide 30 can be rotatably supported by the upper unit 20 using the central axis X as the center of rotation.

A mechanism for determining the rotation ranges of the upper unit 20 and the paper ejection guide 30 is not limited to the stopper such as the upper cover stopper 12 and the paper-ejection guide stopper 13. The image reading apparatus 1 needs only to include a mechanism or a member that regulates the upper unit 20 not to rotate beyond the upper-unit rotation range θ1 or a mechanism or a member that regulates the paper ejection guide 30 not to rotate beyond the ejection-guide rotation range θ2.

In the present embodiment, the medium S is manually fed by the operator; however, a paper feeding method is not limited thereto. The image reading apparatus 1 can include an automatic-paper-feed type reading mechanism (ADF type image reading mechanism) that continuously feeds the stacked sheet-like media S, and reads an image of each medium S.

Figure 10:
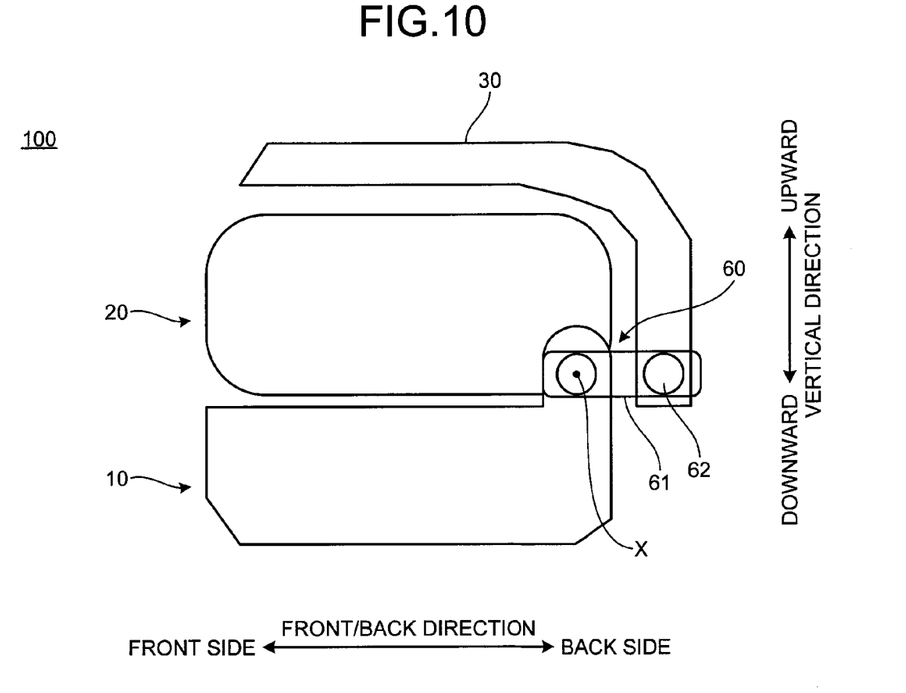
FIG. 10 is a schematic configuration diagram representing an image reading apparatus according to a modification.

A modification of the above embodiment is explained next. In the above embodiment, the paper ejection guide 30 is directly supported by the lower unit 10. Instead, the paper ejection guide 30 can be supported by the lower unit 10 via a link mechanism. FIG. 10 is a schematic configuration diagram representing an image reading apparatus 100 according to the modification.

As shown in FIG. 10, the paper ejection guide 30 is supported by the lower unit 10 via a link mechanism 60. The link mechanism 60 includes a link 61 and a pin 62. The link 61 is rotatably supported by the lower unit 10, using the central axis X as the center of rotation. The paper ejection guide 30 is rotatably supported by the link 61 via the pin 62. The pin 62 is parallel to the central axis X. That is, the paper ejection guide 30 can relatively rotate with respect to the lower unit 10 and the upper unit 20 not only because the link 61 rotates using the central axis X as the center of rotation, but also because the paper ejection guide 30 itself is supported by the pin 62 and rotates.

The paper ejection guide 30 can move to a position in the guide closed state that the paper ejection guide 30 is close to the upper unit 20 by the link mechanism 60. When the paper ejection guide 30 is turned to the guide opened state, the paper ejection guide 30 rotates about the pin 62 as the rotation axis, to ensure a sufficient clearance between the paper ejection guide 30 and the upper unit 20. Accordingly, the clearance between the paper ejection guide 30 and the upper unit 20 can be ensured at the time of clearing paper jam.

In the above embodiment, the medium S is manually taken out at the time of clearing paper jam; however, the image reading apparatus 1 can have a function for assisting clearance of the paper jam. For example, the image reading apparatus 1 can apply a force for inversely rotating the conveying roller 11 to convey the medium S in the opposite direction to the conveyance direction at the time of clearing paper jam.

The paper ejection guide 30 can be opened in conjunction with the chute 15. For example, the chute 15 and the paper ejection guide 30 are connected by a gear mechanism, and when the chute 15 is opened, the paper ejection guide 30 is automatically opened in conjunction with the chute 15. If a totally closed state of the chute 15 corresponds to the guide closed state of the paper ejection guide 30 and a totally opened state of the chute 15 corresponds to the guide opened state of the paper ejection guide 30, the operability of the apparatus can be improved.

According to the present invention, the image reading apparatus can be prevented from being large-sized and a medium is prevented from being lodged between an upper unit and a guide at the time of clearing paper jam.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
   a lower unit;
   an upper unit arranged above the lower unit and rotatably supported by the lower unit; and
   a guide arranged on an opposite side to the lower unit with respect to the upper unit and rotatably supported to be coaxial with the upper unit so that the guide and the upper unit are rotatable around a common axis, wherein
   the guide is relatively rotatable with respect to the upper unit in a direction away from the upper unit so as to form an ejection path, between the upper unit and the guide, for a sheet medium conveyed between the upper unit and the lower unit,
   the upper unit and the guide are in proximity to each other at positions closest to the lower unit in respective rotation ranges of relative rotation with respect to the lower unit, and
   the rotation range of the guide is wider than that of the upper unit, in a rotation direction away from the lower unit from the positions close to each other.

2. The image reading apparatus according to claim 1, further comprising:
   a first stopper configured to regulate the upper unit beyond the rotation range of the upper unit; and
   a second stopper configured to regulate the guide beyond the rotation range of the guide.

3. The image reading apparatus according to claim 2, wherein
   the image reading apparatus is configured to pick up an image of the medium inserted from a front side and eject the medium from a back side, and
   the upper unit and the guide are supported at positions on the back side of the image reading apparatus.

4. The image reading apparatus according to claim 2, wherein
   the image reading apparatus is configured to pick up an image of the medium inserted from a front side and eject the medium from a back side,
   when the guide is at the position closest to the lower unit in the rotation range of the guide, the medium is arranged to be ejected directly to the back side of the image reading apparatus without being conveyed via the ejection path, and when the guide is at a position farthest away from the lower unit in the rotation range of the guide, the medium is arranged to be guided to the ejection path by the guide and ejected via the ejection path.

5. The image reading apparatus according to claim 1, wherein the image reading apparatus is configured to pick up an image of the medium inserted from a front side and eject the medium from a back side, and the upper unit and the guide are supported at positions on the back side of the image reading apparatus.

6. The image reading apparatus according to claim 5, wherein the image reading apparatus is configured to pick up an image of the medium inserted from a front side and eject the medium from a back side, when the guide is at the position closest to the lower unit in the rotation range of the guide, the medium is arranged to be ejected directly to the back side of the image reading apparatus without being conveyed via the ejection path, and when the guide is at a position farthest away from the lower unit in the rotation range of the guide, the medium is arranged to be guided to the ejection path by the guide and ejected via the ejection path.

7. The image reading apparatus according to claim 1, wherein the image reading apparatus is configured to pick up an image of the medium inserted from a front side and eject the medium from a back side, when the guide is at the position closest to the lower unit in the rotation range of the guide, the medium is arranged to be ejected directly to the back side of the image reading apparatus without being conveyed via the ejection path, and when the guide is at a position farthest away from the lower unit in the rotation range of the guide, the medium is arranged to be guided to the ejection path by the guide and ejected via the ejection path.

8. An image reading apparatus, comprising:

a lower unit;

an upper unit arranged above the lower unit and rotatably supported by the lower unit, wherein the upper unit is rotatable relative to the lower unit, about an axis and over a first angular rotation range; and a guide arranged on an opposite side to the lower unit with respect to the upper unit, wherein the guide is rotatable relative to the lower unit, about said axis and over a second angular rotation range, wherein the second angular rotation range of the guide is wider than the first angular rotation range of the upper unit, the guide is rotatable, about said axis and relative to the lower unit, independently of the upper unit, and the guide is rotatable relative to the upper unit in a direction away from the upper unit so as to form an ejection path, between the upper unit and the guide, for a sheet medium conveyed between the upper unit and the lower unit.

9. The image reading apparatus according to claim 8, further comprising:

a first stopper configured to stop the upper unit from rotating beyond the first rotation range of the upper unit; and a second stopper configured to stop the guide from rotating beyond the second rotation range of the guide.

10. The image reading apparatus according to claim 8, wherein the image reading apparatus is configured to pick up an image of the medium inserted from a front side and eject the medium from a back side, and the upper unit and the guide are supported on the back side of the image reading apparatus.

11. The image reading apparatus according to claim 8, wherein the image reading apparatus is configured to pick up an image of the medium inserted from a front side and eject the medium from a back side, when the guide is at the second position closest to the lower unit in the second angular rotation range of the guide, the medium is arranged to be ejected directly to the back side of the image reading apparatus without being conveyed via the ejection path, and when the guide is at a position farthest away from the lower unit in the second angular rotation range of the guide, the medium is arranged to be guided to the ejection path by the guide and ejected via the ejection path.

12. The image reading apparatus according to claim 8, further comprising:

a link having opposite first and second ends, wherein said axis extends through the first end, the link is rotatable, about said axis and relative to the lower unit, at the first end, and the guide is rotatably supported at the second end of the link.

* * * * *